US009756281B2

United States Patent
Tcheng

(10) Patent No.: US 9,756,281 B2
(45) Date of Patent: Sep. 5, 2017

(54) APPARATUS AND METHOD FOR AUDIO BASED VIDEO SYNCHRONIZATION

(71) Applicant: GOPRO, INC., San Mateo, CA (US)

(72) Inventor: David K. Tcheng, Vista, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/017,541

(22) Filed: Feb. 5, 2016

(65) Prior Publication Data

US 2017/0230610 A1    Aug. 10, 2017

(51) Int. Cl.
G11B 27/00 (2006.01)
H04N 5/93 (2006.01)
H04N 9/80 (2006.01)
H04N 5/77 (2006.01)
H04N 5/76 (2006.01)
H04N 5/935 (2006.01)
G11B 27/031 (2006.01)
H04N 5/04 (2006.01)
H04N 21/233 (2011.01)
H04N 9/802 (2006.01)

(52) U.S. Cl.
CPC ........... *H04N 5/935* (2013.01); *G11B 27/031* (2013.01); *H04N 5/04* (2013.01); *H04N 9/802* (2013.01); *H04N 21/233* (2013.01)

(58) Field of Classification Search
USPC ................ 386/239–248, 224, 278–290, 341
See application file for complete search history.

(56) References Cited

U.S. PATENT DOCUMENTS

| | | |
|---|---|---|
| 5,175,769 A | 12/1992 | Hejna |
| 6,564,182 B1 | 5/2003 | Gao |
| 7,012,183 B2 | 3/2006 | Herre |
| 7,256,340 B2 | 8/2007 | Okazaki |
| 7,301,092 B1 | 11/2007 | McNally |
| 7,461,002 B2 | 12/2008 | Crockett |
| 7,521,622 B1 | 4/2009 | Zhang |
| 7,593,847 B2 | 9/2009 | Oh |
| 7,619,155 B2 | 11/2009 | Teo |
| 7,672,836 B2 | 3/2010 | Lee |
| 7,745,718 B2 | 6/2010 | Makino |
| 7,767,897 B2 | 8/2010 | Jochelson |
| 7,863,513 B2 | 1/2011 | Ishii |
| 7,985,917 B2 | 7/2011 | Morris |
| 8,101,845 B2 | 1/2012 | Kobayashi |
| 8,111,326 B1 * | 2/2012 | Talwar .................... H04N 5/04 348/14.08 |
| 8,179,475 B2 | 5/2012 | Sandrew |
| 8,193,436 B2 | 6/2012 | Sim |
| 8,205,148 B1 | 6/2012 | Sharpe |
| 8,223,978 B2 | 7/2012 | Yoshizawa |
| 8,378,198 B2 | 2/2013 | Cho |
| 8,411,767 B2 | 4/2013 | Alexander |
| 8,428,270 B2 | 4/2013 | Crockett |
| 8,497,417 B2 | 7/2013 | Lyon |
| 8,785,760 B2 | 7/2014 | Serletic |
| 8,964,865 B2 | 2/2015 | Alexander |

(Continued)

Primary Examiner — Hung Dang
(74) Attorney, Agent, or Firm — Sheppard Mullin Richter & Hampton LLP

(57) ABSTRACT

Multiple video recordings may be synchronized using audio features of the recordings. A synchronization process may compare energy tracks of each recording within a multi-resolution framework to correlate audio features of one recording to another.

21 Claims, 7 Drawing Sheets

(56) References Cited

U.S. PATENT DOCUMENTS

| | | |
|---|---|---|
| 9,031,244 B2 | 5/2015 | Lang |
| 9,418,643 B2 | 8/2016 | Eronen |
| 2002/0133499 A1 | 9/2002 | Ward |
| 2003/0033152 A1 | 2/2003 | Cameron |
| 2004/0083097 A1 | 4/2004 | Chu |
| 2004/0094019 A1 | 5/2004 | Herre |
| 2004/0148159 A1 | 7/2004 | Crockett |
| 2004/0165730 A1 | 8/2004 | Crockett |
| 2004/0172240 A1 | 9/2004 | Crockett |
| 2004/0254660 A1 | 12/2004 | Seefeldt |
| 2004/0264561 A1 | 12/2004 | Alexander |
| 2005/0021325 A1 | 1/2005 | Seo |
| 2005/0091045 A1 | 4/2005 | Oh |
| 2005/0234366 A1 | 10/2005 | Heinz |
| 2006/0021494 A1 | 2/2006 | Teo |
| 2006/0080088 A1 | 4/2006 | Lee |
| 2006/0107823 A1 | 5/2006 | Platt |
| 2007/0055503 A1 | 3/2007 | Chu |
| 2007/0055504 A1 | 3/2007 | Chu |
| 2007/0061135 A1 | 3/2007 | Chu |
| 2007/0163425 A1 | 7/2007 | Tsui |
| 2007/0240556 A1 | 10/2007 | Okazaki |
| 2008/0148924 A1 | 6/2008 | Tsui |
| 2008/0304672 A1 | 12/2008 | Yoshizawa |
| 2008/0317150 A1 | 12/2008 | Alexander |
| 2009/0049979 A1 | 2/2009 | Naik |
| 2009/0056526 A1 | 3/2009 | Yamashita |
| 2009/0170458 A1 | 7/2009 | Molisch |
| 2009/0217806 A1 | 9/2009 | Makino |
| 2009/0287323 A1 | 11/2009 | Kobayashi |
| 2010/0257994 A1 | 10/2010 | Hufford |
| 2011/0167989 A1 | 7/2011 | Cho |
| 2012/0103166 A1 | 5/2012 | Shibuya |
| 2012/0127831 A1* | 5/2012 | Gicklhorn ............ G01S 3/8083 367/118 |
| 2012/0297959 A1 | 11/2012 | Serletic |
| 2013/0025437 A1 | 1/2013 | Serletic |
| 2013/0201972 A1 | 8/2013 | Alexander |
| 2013/0220102 A1 | 8/2013 | Savo |
| 2013/0304243 A1* | 11/2013 | Iseli ....................... G06F 17/00 700/94 |
| 2013/0339035 A1 | 12/2013 | Chordia |
| 2014/0053710 A1 | 2/2014 | Serletic, II |
| 2014/0053711 A1 | 2/2014 | Serletic, II |
| 2014/0067385 A1 | 3/2014 | Oliveira |
| 2014/0123836 A1 | 5/2014 | Vorobyev |
| 2014/0180637 A1 | 6/2014 | Kerrigan |
| 2014/0307878 A1 | 10/2014 | Osborne |
| 2015/0279427 A1* | 10/2015 | Godfrey ................. G11B 27/10 386/241 |
| 2016/0192846 A1 | 7/2016 | Shekhar |

\* cited by examiner

APPARATUS AND METHOD FOR AUDIO BASED VIDEO SYNCHRONIZATION

FIELD OF THE INVENTION

The disclosure relates to synchronizing multiple media recordings using audio features of the media recordings.

BACKGROUND OF THE INVENTION

It is known that multiple media recordings may be generated during the same live occurrence. The media recordings obtained from multiple media capture devices during the same live occurrence may be synchronized using the audio features of the media recordings.

SUMMARY

With the exponential rise in the number and quality of personal media recording devices, it has become commonplace for people to record audio and video at various social events, such as concerts, sporting events, etc. Often, multiple people record the same event using their own device. Thus, creating multiple recordings of the same event or occurrence.

It has also become commonplace for a person to own several recording media capture devices. An individual may wish to record his own musical performance, for example, using multiple devices. Some user generated videos may be captured by users and shared via social networks. Given that hundreds or even thousands of recordings of a single event (e.g., a sporting event, a concert, a lecture, etc.) may be uploaded by users, having the ability to adjust the time shift between all of the recordings would allow for the alignment of the recordings with each other. However, achieving video synchronization involves overcoming several challenges posed by the inherent characteristics of such social videos. For example, they tend to have poor sound quality, there is often local noise due to the environment in which the video is being captured, and extreme camera shake is a regular problem. Furthermore, the synchronization of social videos may need to be performed utilizing lower bandwidth.

In some implementations, a system configured for video synchronization of multiple media files using audio features may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of an audio track component, an energy track component, a comparison component, a temporal alignment component, a synchronizing component, and/or other components.

The audio track component may be configured to obtain a first audio track from a first media file. The audio track component may be configured to obtain a second audio track from the second media file. The first media file and the second media file may be available within the repository of media files available via system and/or available on a third party platform, which may be accessible and/or available via system. The first media file and/or the second media file may be media files captured by the same user via one or more client computing platform(s) and/or may be media files captured by other users. The first media file and the second media file may be of the same live occurrence. The audio track component may be configured to obtain the first audio track by extracting audio features from the first media file. The audio track component may be configured to obtain the second audio track by extracting audio features from the second media file. The audio track component may be configured to extract audio features from each of the media files by applying a frequency band to each of the media files. Audio features of the first audio track may be converted to a first sequence of audio samples. Audio features of the second audio track may be converted to a second sequence of audio samples. A pair of adjacent audio samples within the first sequence of audio samples may be converted to a first feature estimate. A pair of adjacent audio samples within the second sequence of audio samples may be converted to a second feature estimate. One or more feature estimates obtained by converting adjacent audio samples may include energy, volume, pitch, and/or bandwidth.

The energy track component may be configured to obtain a first energy track from the first audio track. The energy track component may be configured to obtain a second energy track from the second audio track. The energy track component may be configured to obtain the first energy track by extracting energy features from the first audio track. The energy track component may be configured to obtain the second energy track by extracting energy features from the second audio track. The energy track component may be configured to convert the first energy track to a first sequence of energy samples. The energy track component may be configured to convert the second energy track to a second sequence of energy samples. The energy track component may be configured to arrange the first sequence of energy samples in a multi-resolution representation. The energy track component may be configured to arrange the second sequence energy samples in a multi-resolution representation. A multi-resolution representation may provide a hierarchical framework of energy samples at varying resolutions. The energy samples within a multi-resolution framework may correspond to different resolution levels of the energy track. The energy track at different resolutions may represent different audio features within the audio track of the media file.

The energy track component may be configured to assign an energy magnitude to the first sequence of energy samples in a multi-resolution representation. The energy track component may be configured to assign an energy magnitude to the second sequence of energy samples in a multi-resolution representation. The energy magnitude may correspond to a number of energy samples within a certain sampling time period at a particular resolution level in a multi-resolution representation. A number of energy samples at every resolution level may be directly related to the level of energy magnitude.

The comparison component may be configured to compare the first energy track against the second energy track to correlate one or more features in the first energy track with one or more features in the second energy track. Comparison component may be configured to compare the first sequence of energy samples of first energy track against the second sequence of energy samples of the second energy track. Comparison component may be configured to compare the first sequence of energy samples of the first energy track against the second sequence of energy samples of the second energy track within the multi-resolution framework obtained via energy track component. The first comparison may be performed at mid-resolution level. The first sequence of energy samples at mid-resolution level may be compared against the second sequence of energy samples at mid-resolution level to correlate the energy samples in the first sequence of energy samples of the energy track with the energy samples in the second sequence of energy samples of the second energy track. The result of the first comparison may identify correlated energy samples from first and second sequence of energy samples of first and second energy tracks that may represent energy in the same sounds during the live occurrence. The result of the first comparison may be transmitted to the system after the first comparison is completed. The second comparison may be performed at a level of resolution higher than the mid-resolution level. The first sequence of energy samples at a higher resolution level than the mid-resolution level may be compared against the second sequence of energy samples at a higher resolution level than the mid-resolution level to correlate energy samples in the first energy track with energy samples in the second energy track. The result of second comparison may be transmitted to the system after the second comparison is completed. This process may be iterative such that the comparison component may compare the first sequence of energy samples against the second sequence of energy samples at every resolution level whereby increasing the resolution with each iteration until the highest level of resolution is reached. The last iteration of the process may be performed at the highest resolution level. The system may accumulate a number of transmitted correlation results obtained from the process performed by the comparison component.

In various implementations, the comparison component may be configured to compare the first energy track against the second energy track while applying one or more constraint parameter to control the comparison process. The comparison constraint parameters may include one or more of limiting comparison time, limiting number of energy samples compared, limiting the number comparison iterations.

The temporal alignment component may be configured to determine a temporal alignment estimate between the first audio track and the second audio track based on the result of comparison of the first energy track against the second energy track via the comparison component which may have been transmitted to the system. The temporal alignment estimate may reflect an offset in time between a commencement of sound capture for the first audio track and a commencement of sound capture for the second audio track. In some implementations, the temporal alignment estimate may reflect corresponding energy samples between the first energy track and the second energy track.

The synchronizing component may be configured to synchronize the first media file using audio features of first audio track with second media file using audio features of the second audio track. The synchronizing component may be configured to synchronize the first audio track with the second audio track based on the temporal alignment estimate. In some implementations, the time offset between energy tracks may be used to synchronize audio tracks by aligning the audio tracks based on the time offset calculation.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
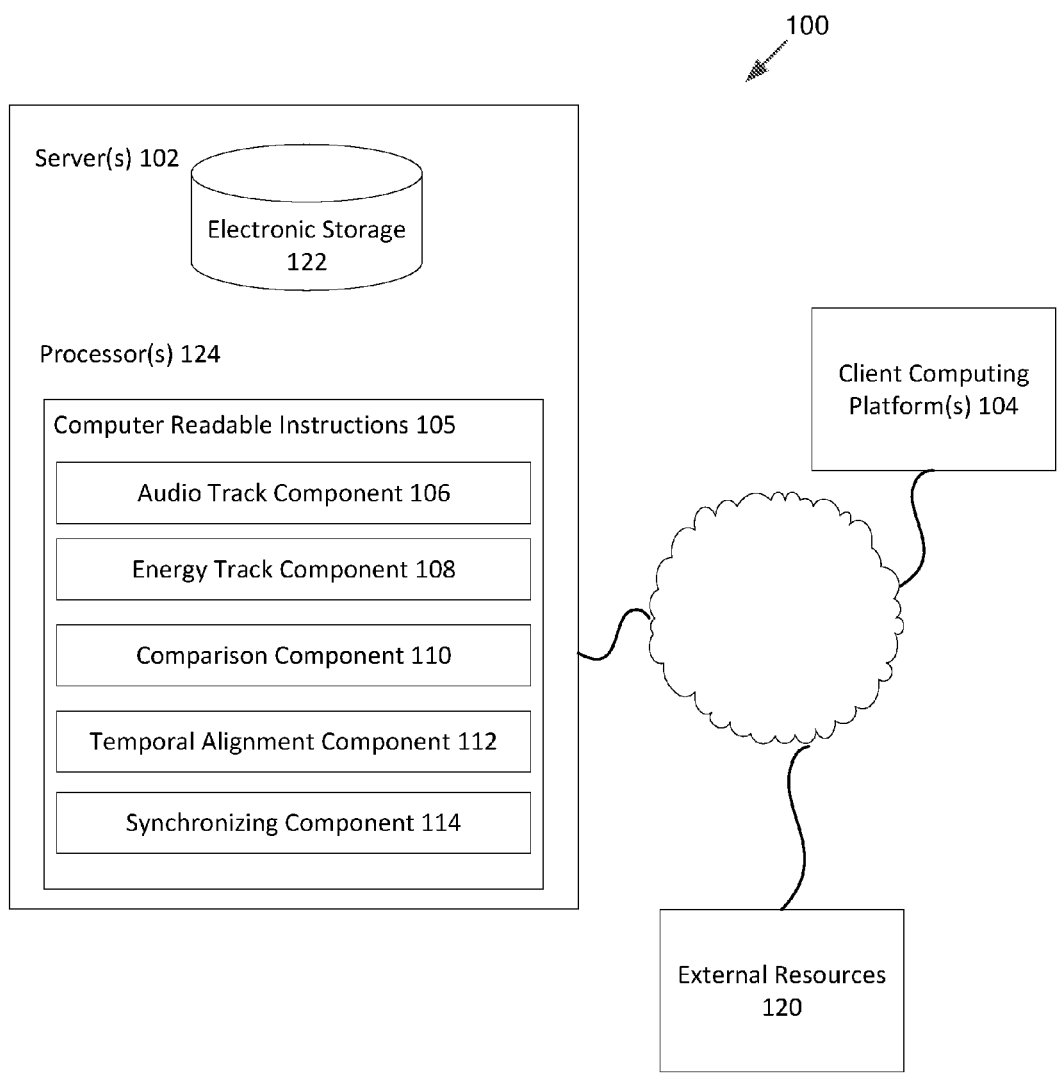
FIG. 1 illustrates a system for video synchronization using audio features, in accordance with one or more implementations.

FIG. 1 illustrates a system 100 for video synchronization using audio features, in accordance with one or more implementations. As is illustrated in FIG. 1, system 100 may include one or more server(s) 102. Server(s) 102 may be configured to communicate with one or more client computing platforms 104 according to a client/server architecture. The users of system 100 may access system 100 via client computing platform(s) 104. Server(s) 102 may be configured to execute one or more computer program components. The computer program components may include one or more of audio track component 106, energy track component 108, comparison component 110, temporal alignment component 112, synchronizing component 114, and/or other components.

A repository of media files may be available via system 100. The repository of media files may be associated with different users. In some implementations, system 100 and/or server(s) 102 may be configured for various types of media files that may include video files that include audio content, audio files, or other types of files that include some audio content. Other types of media items may include one or more of audio files (e.g., music, podcasts, audio books, and/or other audio files), multimedia presentations, photos, slideshows, and/or other media files. The media files may be received from one or more storage locations associated with client computing platform(s) 104, server(s) 102, and/or other storage locations where media files may be stored. Client computing platform(s) 104 may include one or more of a cellular telephone, a smartphone, a digital camera, a laptop, a tablet computer, a desktop computer, a television set-top box, a smart TV, a gaming console, and/or other client computing platforms. In one embodiment, the plurality of media files may include audio files that do not contain video content.

Audio track component 106 may be configured to obtain a first audio track from a first media file. Audio track component 106 may be configured to obtain a second audio track from the second media file. The first media file and the second media file may be available within the repository of media files available via system 100 and/or available on a third party platform, which may be accessible and/or available via system 100.

The first media file and/or the second media file may be media files captured by the same user via one or more client computing platform(s) 104 and/or may be media files captured by other users. The first media file and the second media file may be of the same live occurrence. As one example, the media files may include files of the same event, such as videos of a sporting event, concert, wedding, etc. taken from various perspectives by different users. The first media file and the second media file may not be of the same live occurrence but may be of the same content. For example, a user recorded file of a song performance and the same song performance by a professional artist.

Audio track component 106 may be configured to obtain a first audio track by extracting audio features from the first media file. Audio track component 106 may be configured to obtain a second audio track by extracting audio features from second media file. Audio track component 106 may be configured to extract audio features from each of the media files by applying a frequency band to each of the media files. In one embodiment, the frequency band applied to the media file may be for frequencies between 1000 Hz and 5000 Hz. Audio features of the first audio track may be converted to a first sequence of audio samples. Audio features of the second audio track may be converted to a second sequence of audio samples. A pair of adjacent audio samples within the first sequence of audio samples may be converted to a first feature estimate. A pair of adjacent audio samples within the second sequence of audio samples may be converted to a second feature estimate. One or more feature estimates obtained by converting adjacent audio samples may include energy, volume, pitch, and/or bandwidth.

Energy track component 108 may be configured to obtain a first energy track from a first audio track. Energy track component 108 may be configured to obtain a second energy track from the second audio track. Energy track component 108 may be configured to obtain the first energy track by extracting energy features from the first audio track. Energy track component 108 may be configured to obtain the second energy track by extracting energy features from the second audio track. Energy track component 108 may be configured to extract energy features from the first audio track by comparing adjacent audio samples within the first sequence of audio samples of the first audio track. Energy track component 108 may be configured to extract energy features from the second audio track by comparing adjacent audio samples within the second sequence of audio samples of the second audio track. Energy track component 108 may be configured to convert the first energy track to a first sequence of energy samples. Energy track component 108 may be configured to convert the second energy track to a second sequence of energy samples.

Figure 2:
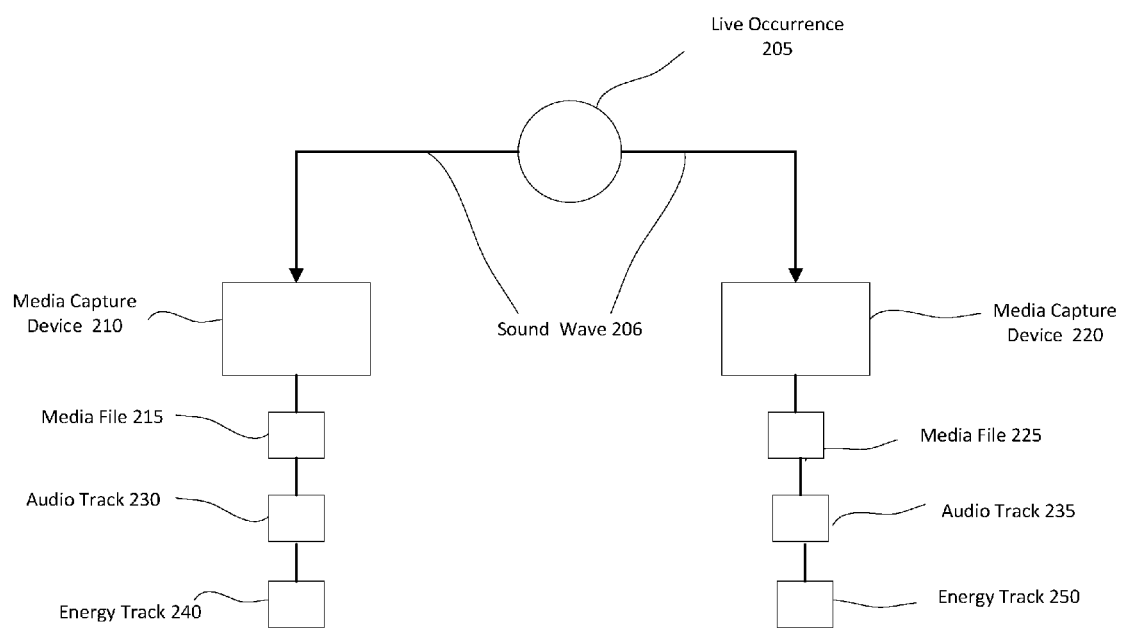
FIG. 2 illustrates an exemplary process of obtaining two audio tracks from the audio information captured by two media capture devices during a live occurrence and included in two media files, in accordance with one or more implementations.

For example and referring to FIG. 2, first media capture device 210 may be configured to capture oscillations of the sound wave 206 during live occurrence 205. Second media capture device 220 may be configured to capture oscillations of sound wave 206 during live occurrence 205. While both devices may be capturing the same live occurrence 205, due to the differences in individual capture settings, captured information may vary from the temporal and/or spatial perspective associated with each capture. Video and/or audio information captured by first media capture device 210 may be included in the first media file 215 and may be included within the repository of media files available via system 100. Video and/or audio information captured by second media capture device 220 may be included in the second media file 225 and may be included within the repository of media files available via system 100. System 100 may obtain first audio track 230 from media file 215. System 100 may obtain second audio track 235 from media file 225. The energy features of each audio track 230 and 235 may be extracted. Thus, system 100 may obtain first energy track 240 from audio track 230. System 100 may obtain second energy track 250 from audio track 235.

Referring back to FIG. 1, energy track component 108 may be configured to arrange a first sequence of energy samples of the first energy track in a multi-resolution representation. Energy track component 108 may be configured to arrange a second sequence of energy samples of the second energy track in a multi-resolution representation. A multi-resolution representation may provide a hierarchical framework of energy samples at varying resolutions. Energy samples within a multi-resolution framework may correspond to different resolution levels within the energy track. The energy track at different resolutions may represent different audio features within the audio track of the media file. For example, energy track at low resolution may represent a certain number of audio features within the audio track of the media file. At a high resolution, the number of these feature may be different. As the resolution increases the likelihood of finding corresponding energy samples between the first energy track and the second energy may increase. It may be desirable to compare audio at low resolution and then gradually increase the resolution. Within the same sampling time period, the number of energy samples at a certain resolution level may be equal to half of the number of energy samples at the previous resolution level. For example, at the highest level of resolution, the energy track may contain 1024 or N energy samples. At the next level of resolution that is lower than the highest level of resolution, the energy track may have 512 or N/2 energy samples. Each subsequent level of resolution may contain 256, 128, 64, 32, 16, 8, 4, 2, and until the lowest level of resolution is reached containing only one energy sample. The single energy sample at the lowest level of resolution may represent all the energy within a specific time interval within that energy track. Conversely, the energy contained within each of the 1024 samples at the highest level of resolution may represents the lowest single unit of energy associated with the energy track.

In various implementations, other feature estimates obtained by converting adjacent audio samples contained in the audio track may be configured as a sequence of feature samples. The sequence of feature estimates may be arranged in a multi-resolution representation to provide a hierarchical framework of feature samples at varying resolutions.

Energy track component 108 may be configured to assign an energy magnitude to the first sequence of energy samples in a multi-resolution representation. Energy track component 108 may be configured to assign an energy magnitude to the second sequence of energy samples in a multi-resolution representation. The energy magnitude may correspond to a number of energy samples within a certain sampling time period at a particular resolution level in a multi-resolution representation. The number of energy samples at every resolution level may be directly related to the level of energy magnitude. Thus, the higher the resolution, the higher the number of energy samples at that level of resolution, the higher the level of energy magnitude. Conversely, the lower the resolution, the lower the number of energy samples at that level of resolution, the lower the level of energy magnitude. If the sampling time period remains the same, then the energy magnitude at every resolution level from lowest to highest may increase. If sampling time period within the multi-resolution representation changes, then the energy magnitude at every resolution level from lowest to highest may remain the same. For example, if the sampling time period increases with each resolution level from lowest to highest, then the number of energy samples at a lower resolution level may remain the same as the number of energy samples at a higher resolution.

Figure 3:
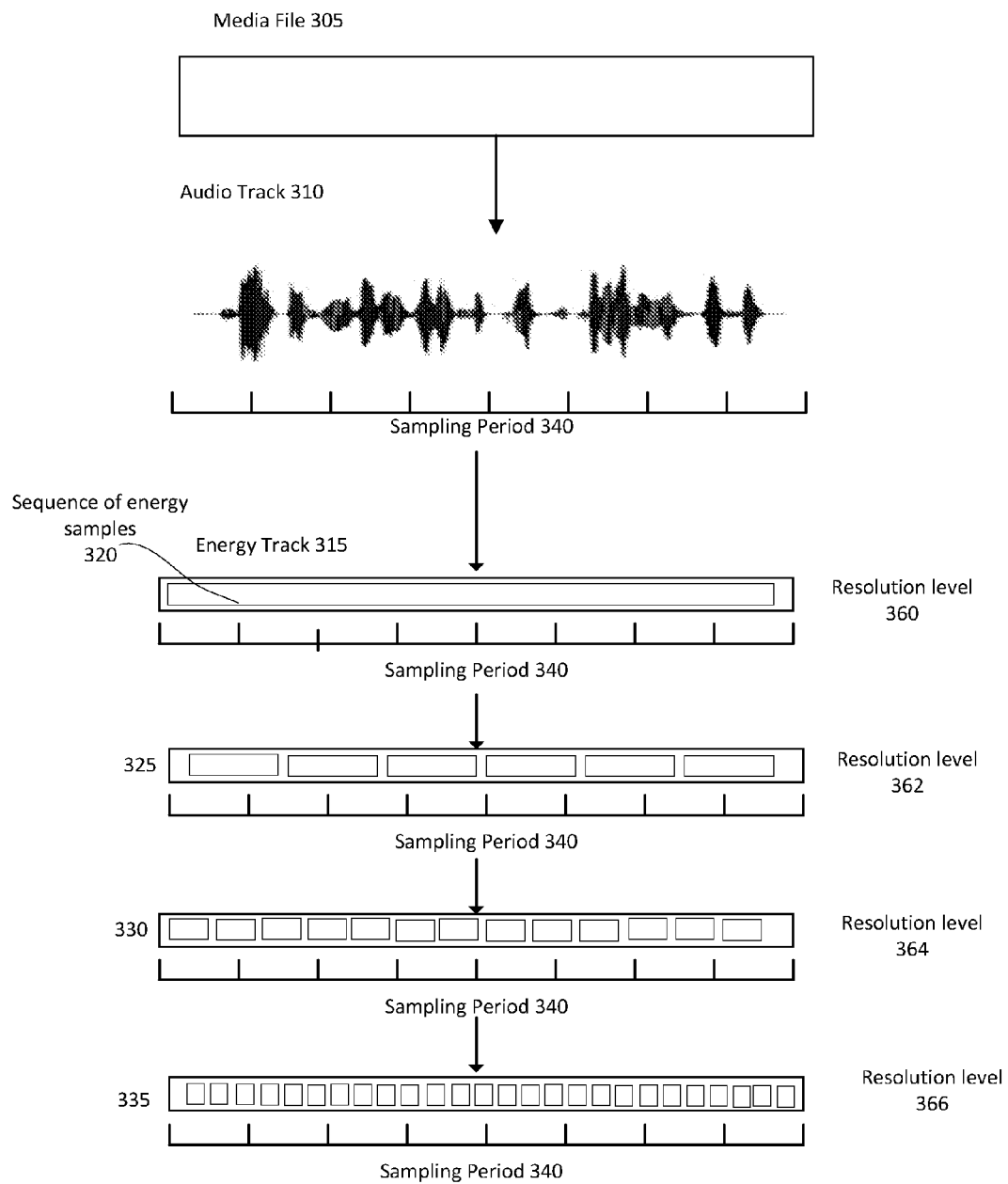
FIG. 3 illustrates an exemplary process of obtaining energy samples from a media file, in accordance with one or more implementations.

For example and referring to FIG. 3, audio track 310 may be obtained by audio track component 106 of FIG. 1 from media file 305 and may be included within the repository of audio tracks available via system 100 of FIG. 1. Media file 305 may include both audio and video content. Energy track 315 may be obtained via energy track component 108 from audio track 310. Energy track 315 may be converted to a sequence of energy samples, each sequence of energy samples may be arranged in a multi-resolution representation within the same sampling time period 340. Sequence of energy samples 320 at sampling time period 340 may represent the energy of energy track 315 at the lowest resolution level 360. Sequence of energy samples 325 at sampling time period 340 may represent the energy of energy track 315 at a higher resolution level 362. Resolution level 362 may be higher than resolution level 360. Sequence of energy samples 330 at sampling time period 340 may represent the energy of energy track 315 at a higher resolution level 364. Resolution level 364 may be higher than resolution level 362 and/or 360. Sequence of energy samples 335 at sampling time period 340 may represent the energy of energy track 315 at the highest resolution level 366. Resolution level 366 may be higher than resolution level 364, 362 and/or 360. The number of energy samples within the sequence of energy samples may decrease by half as the resolution level decrease and the sampling time period remains the same. The number of energy samples within sequence of energy samples 335 at resolution level 366 is double the number of energy samples within sequence of energy samples 330 at resolution level 364. The number of energy samples within sequence of energy samples 335 at resolution level 366 is four times the number of energy samples within sequence of energy samples 325 at resolution level 362. The number of energy samples within sequence of energy samples 335 at resolution level 366 is eight times the number of energy samples within sequence of energy samples 320 at resolution level 360.

Referring back to FIG. 1, comparison component 110 may be configured to compare the first energy track against the second energy track to correlate one or more audio features in the first energy track with one or more features in the second energy track. Comparison component 110 may be configured to compare the first sequence of energy samples of the first energy track against the second sequence of energy samples of the second energy track. Comparison component 110 may be configured to compare the first sequence of energy samples against the second sequence of energy samples within the multi-resolution framework obtained via energy track component 108 of FIG. 1. The first comparison may be performed at the mid-resolution level. The first sequence of energy samples at the mid-resolution level may be compared against the second sequence of energy samples at the mid-resolution level to correlate the energy samples in the first energy track with the energy samples in the second energy track. The result of first comparison may identify correlated energy samples from first and second energy tracks that may represent energy in the same sounds during the live occurrence. The result of first comparison may be transmitted to system 100 after first comparison is completed. The second comparison may be performed at a level of resolution higher than mid-resolution level. The first sequence of energy samples at a higher resolution level than the mid-level resolution level may be compared against the second sequence of energy samples at a higher resolution level than the mid-level resolution level to correlate the energy samples in the first energy track with the energy samples in the second energy track. The result of the second comparison may be transmitted to system 100 after the second comparison is completed. This process may be iterative such that comparison component 110 may compare the first sequence of energy samples against the second sequence of energy samples at every resolution level whereby increasing the resolution with each iteration until the highest level of resolution is reached. For example, if the number of resolution levels within each energy track is finite, comparison component 110 may be configured to compare the energy tracks at the mid-resolution level first, then, at next iteration, the comparison component 110 may be configured to compare the energy tracks at a resolution level higher than the resolution level of previous iteration. The last iteration of the process may be performed at the highest resolution level. System 100 may accumulate a number of transmitted correlation results obtained from the process performed by comparison component 110.

In various implementations, comparison component 110 may be configured to compare the first energy track against the second energy track while applying one or more constraint parameter to control the comparison process. The comparison constraint parameters may include one or more of limiting comparison time, limiting number of energy samples compared, limiting the number of comparison iterations.

Comparison component 110 may be configured to determine the time it took to compare the first sequence of energy samples against the second sequence of energy samples at the mid-resolution level. Time taken to compare the first sequence of energy samples against the second sequence of energy samples at the mid-resolution level may be transmitted to system 100. Comparison component 110 may utilize the time taken to compare the first sequence of energy samples against the second sequence of energy samples at the mid-resolution level in subsequent comparison iterations. For example, the time taken to compare two energy tracks at a low resolution to correlate energy samples of those energy tracks may be equal to 5 seconds. Comparison component 110 may be configured to limit the next comparison iteration at a higher resolution to 5 seconds. In one implementation, the time taken to compare two energy tracks may be utilized by the other constraint comparison parameters as a constant value.

Comparison component 110 may be configured to limit the portion of the first energy track based on a comparison window parameter. Comparison component 110 may be configured to limit the portion the second energy track based on the comparison window parameter. The comparison window parameter may have a predetermined number of energy samples. Comparison component 110 may be configured to limit the number of energy samples in the first sequence of energy samples to the number of energy samples in the comparison window parameter. Comparison component 110 may be configured to limit the number of energy samples in the second sequence of energy samples to the number of energy samples in the comparison window parameter. Comparing component 110 may be configured to only compare energy samples of the first sequence of energy samples against the energy samples of the second sequence of energy samples limited by the comparison window parameter. In accordance with one or more implementation, the number of the energy samples within the comparison window parameter may not be greater than 50 percent of the total number of energy samples at a certain resolution level. For example, if the energy track contains 1024 energy samples at a certain resolution level, then the length of comparison window parameter may not be greater than 512 energy samples.

The comparison window parameter may have a predetermined start position that may be generated by system 100 and/or may be based on user input. System 100 may generate the start position of the comparison window be based on the total length of the energy track, i.e. the total number of energy samples at a certain resolution level. The start position may be randomly set in the first one third of the total number of energy samples within energy track. In some implementations, the user may generate the start position of the comparison window based on specific audio features of the energy track. For example, user may know that the first audio track and the second audio track may contain audio features that represent sound captured at the same football game, specifically first touchdown of the game. Energy sample representing audio features associated with a touchdown may be used to generate the start position of comparison window.

Figure 5:
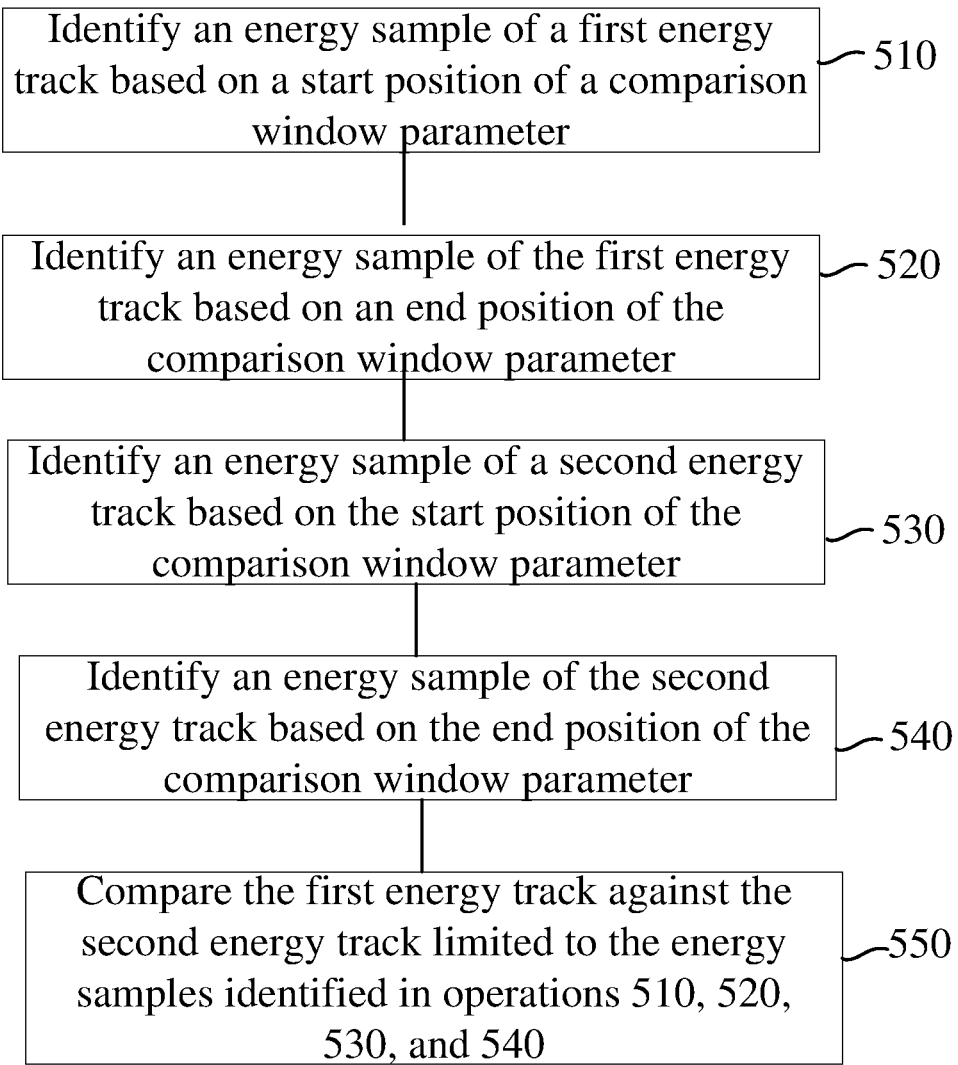
FIG. 5 illustrates applying a comparison window to a synchronization process, in accordance with one or more implementations.

For example, and referring to FIG. 5, the comparison window parameter may be applied to all the comparison iterations. At operation 510, the energy sample of the first sequence of energy samples of the first energy track at first resolution level is identified based on the start position of the comparison window parameter. At operation 520, the energy sample of the first sequence of energy samples of first energy track at first resolution level may be identified based on the end position of the comparison window parameter. At operation 530, the energy sample of the second sequence of energy samples of second energy track at first resolution level may be identified based on the start position of the comparison window parameter. At operation 540, the energy sample of the second sequence of energy samples of second energy track at first resolution level may be identified based on the end position of the comparison window parameter. At operation 550, comparison component 110 may be configured to compare first sequence of energy samples of first energy track against a second sequence of energy samples of second energy track limited to the energy samples identified in operations 510, 520, 530, and 540.

Referring back to FIG. 1, comparison component t 110 may be configured to limit the same portion of the first and second energy track based on the comparison window parameter during every comparison iteration. In other implementations, comparison component 110 may be configured to limit different portions of the first and second energy tracks based on the comparison window parameter during each comparison iteration. For example, the comparison window parameter may be generated each time the comparison of the energy tracks at a specific resolution is performed. In other words, the start position of the comparison window parameter may be different at every comparison iteration irrespective of the start position of the comparison window parameter at the previous resolution level.

Comparison component 110 may be configured to limit the number of comparison iterations based on a correlation threshold parameter. Comparison component 110 may be configured to generate a correlation coefficient based on the result of first comparison that may identify correlated energy samples from the first and second energy tracks. Comparison component 110 may be configured to obtain a threshold value. The threshold value may be generated by system 100 and/or may be based on user input. Comparison component 110 may be configured to compare the correlation coefficient against the threshold value. Comparison component 110 may be configured to limit the comparison iteration if the correlation coefficient falls below the threshold value.

Figure 6:
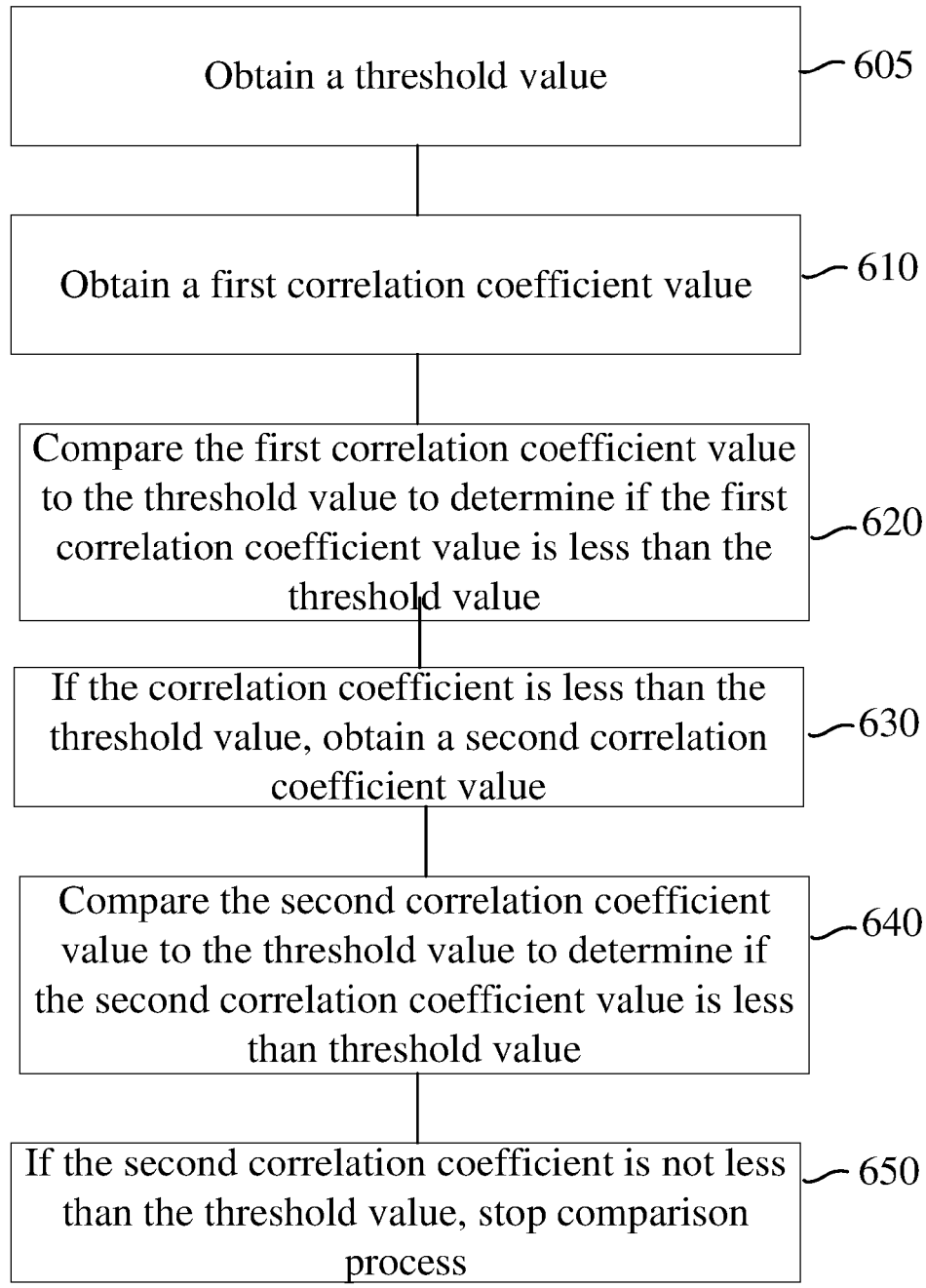
FIG. 6 illustrates limiting the number of comparison iterations performed by a synchronization process, in accordance with one or more implementations.

For example, and referring to FIG. 6, a number of comparisons performed by the comparison component 110 of FIG. 1 may be based on whether a correlation coefficient is higher than a threshold value. At operation 605, the threshold value obtained may be equal to 0.5. At operation 610, the correlation coefficient may be equal to 0.3. At operation 620, comparison component 110 of FIG. 1 may be configured to compare the correlation coefficient of 0.3 the threshold value of 0.5 and determine that the correlation coefficient is less than the threshold value. At operation 630, comparison component 110 may be configured to perform another comparison iteration and generate the correlation coefficient that may be equal to 0.55. At operation 640, comparison component 110 may be configured to compare the correlation coefficient of 0.55 to the threshold value of 0.5 and determine that correlation coefficient is greater than threshold value. At operation 650, comparison component 110 may be configured to stop the comparison iteration because the correlation coefficient was greater than the threshold value.

Temporal alignment component 112 may be configured to determine a temporal alignment estimate between the first audio track and the second audio track based on the result of comparison of the first energy track against the second energy track via comparison component 110 transmitted to system 100 of FIG. 1 as described above. The temporal alignment estimate may reflect an offset in time between a commencement of sound capture for the first audio track and a commencement of sound capture for the second audio track. In some implementations, the temporal alignment estimate may reflect a corresponding energy sample between the first energy track and the second energy track.

Temporal alignment component 112 may be configured to extract a pair of matching energy samples within the first energy track and the second energy track. Temporal alignment component 112 may extract a pair of matching energy samples from the first result of comparison of the first energy track against the second energy track that may represent energy in the same sounds during the live occurrence. Temporal alignment component 112 may extract the pair of matching energy samples from each comparison iteration via comparison component 110. Temporal alignment component 112 may be configured to calculate the Δt or time offset based on the position of the matching energy samples within the corresponding energy track.

In some implementations, temporal alignment component 112 may be configured to determine multiple temporal alignment estimates between the first audio track and the second audio track. Each temporal alignment estimate may be based on comparing the first energy track against the second energy track via comparison component 110 transmitted to system 100 as described above. Temporal alignment component 112 may be configured to assign a weight to each of the temporal alignment estimates. Temporal alignment component 112 may be configured to determine a final temporal alignment estimate by computing weighted averages of multiple temporal alignment estimates.

Synchronizing component 114 may be configured to synchronize the first media file using the audio features of the first audio track with the second media file using the audio features of the second audio track. Synchronizing component 114 may be configured to synchronize the first audio track with the second audio track based on the temporal alignment estimate. In some implementations, the time offset between the energy tracks may be used to synchronize the audio tracks by aligning the audio tracks based on the time offset calculation.

Figure 4:
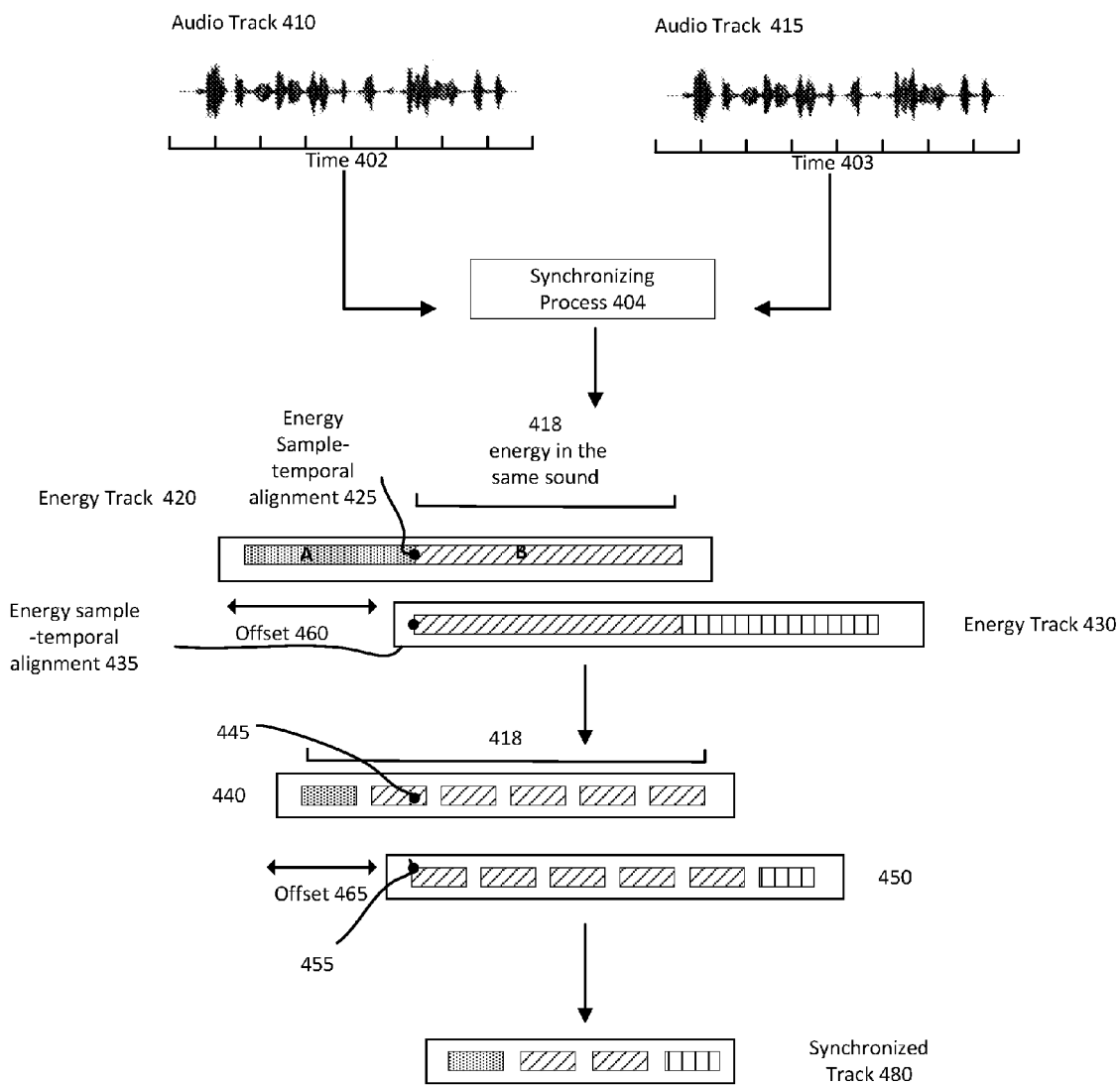
FIG. 4 illustrates an example of synchronizing two energy tracks, generated from respective audio tracks, in accordance with one or more implementations.

For example, and referring to FIG. 4, synchronization process 404 may generate synchronized audio track 480. Synchronized audio track 480 may include one or more a portion of first audio track 410 and one or more a portion of second audio track 415. A portion of first audio track 410 and a portion of second audio track 415 representing energy in the same sound 418 may be determined based on time offset 460. Synchronized audio track 480 may include the portion of first audio track 410 and the portion of second audio track 415. The portion of first audio track 410 may correspond to a portion of first energy track 420 at a lower resolution. The portion of second audio track 415 may correspond to a portion of second energy track 430 at a lower resolution. Synchronized track 480 may include the portion of first energy track 420 equal to the time offset 460 (e.g., portion A) and the portion of second energy track 430 greater than the time offset 460 (e.g., portion B). In some implementations, first temporal alignment energy sample 425 and second temporal alignment energy sample 435 may be used to determine the portion of first audio track 410 and the portion of second audio track 415 to be included in synchronized track 480. In some implementations, first energy track 420 may represent energy of the first audio track at a lower resolution. First energy track 440 may represent energy of the first audio track at a higher resolution than resolution of first energy track 420. Second energy track 430 may represent energy of the second audio track at a lower resolution. Second energy track 450 may represent energy of the second audio track a higher resolution than resolution of second energy track 430. Time offset 465 may reflect a time difference between a commencement of sound capture for energy track 440 and a commencement of sound capture for energy track 450. Synchronized track 480 may include a portion of energy the first energy track 440 at a higher resolution equal to the time offset 465 and a portion of second energy track 450 at a higher resolution. In some implementations, first temporal alignment energy sample 445 at a higher resolution than the first temporal alignment energy sample 425 and second temporal alignment energy sample 450 at a higher resolution than second temporal alignment sample 435 may be used to determine the portion of first audio track 410 and the portion of second audio track 415 to be included in synchronized track 480.

Referring again to FIG. 1, in some implementations, a user may generate a first media file containing both video and audio components. User may generate a second media file containing audio component corresponding to the same live occurrence. User may want to synchronize first media file with second media file. For example, a group of friends may record a video of them singing a musical composition. They may wish to overlay an audio component of the same musical composition they or another user performed earlier in the studio with the video file. By synchronizing the video file with the pre-recorded audio file users obtain a video file that contains a pre-recorded audio component overplayed over the video component.

In some implementations, system 100 may synchronize media files from three, four, five, or more media capture devices (not illustrated) capturing the same live occurrence. Users capturing live occurrence simultaneously may be located near or away from each other and may make recordings from various perspectives.

In some implementations, the plurality of media files may be generated by the same user. For example, a user may place multiple media recording devices around himself to record himself from various perspectives. Similarly, a film crew may generate multiple media files during a movie shoot of the same scene.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114 and/or other components. The processor(s) 124 may be configured to execute components 106, 108, 110, 112, 114, and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, and/or 114 may be located remotely from the other components. The description of the functionality provided by the different components 106, 108, 110, 112, and/or 114 described herein is for illustrative purposes, and is not intended to be limiting, as any of components 106, 108, 110, 112, and/or 114 may provide more or less functionality than is described. For example, one or more of components 106, 108, 110, 112, and/or 114 may be eliminated, and some or all of its functionality may be provided by other ones of components 106, 108, 110, 112, and/or 114. As another example, processor(s) 124 may be configured to execute one or more additional components that may perform some or all of the functionality attributed herein to one of components 106, 108, 110, 112, and/or 114.

Figure 7:
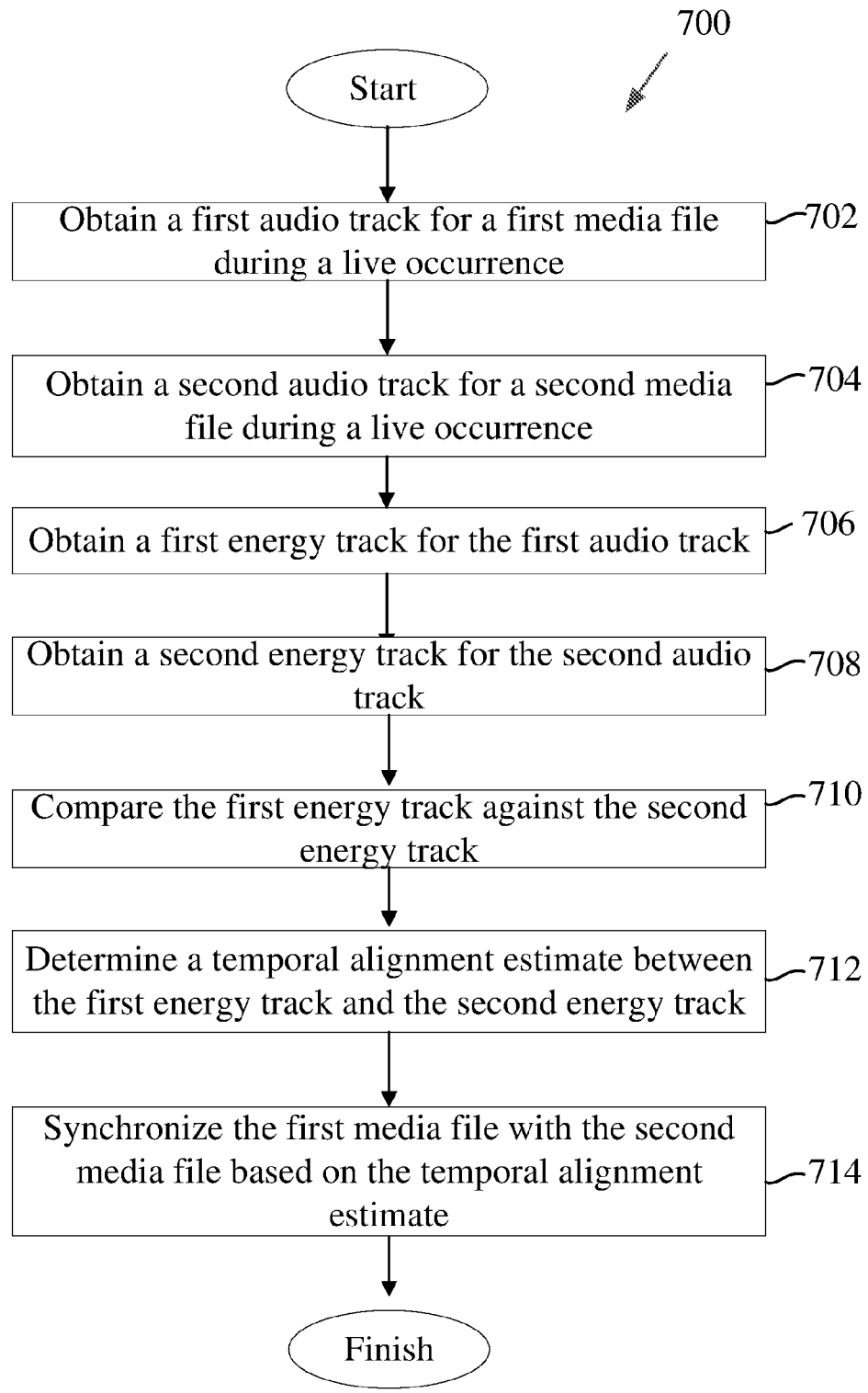
FIG. 7 illustrates a method for synchronizing video files using audio features, in accordance with one or more implementations.

FIG. 7 illustrates a method 700 for synchronizing video files using audio features, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, a first audio track for a first media file may be obtained. At an operation 704, for a second audio track for a second media file may be obtained. Operations 702 and 704 may be performed by an audio track component that is the same as or similar to audio track component 106, in accordance with one or more implementations.

At an operation 706, a first energy track for a first audio track may be obtained. At an operation 708, for a second energy track for a second audio track may be obtained. Operations 706 and 708 may be performed by an energy track component that is the same as or similar to energy track component 108, in accordance with one or more implementations.

At an operation 710, the first energy track is compared against the second energy track. Operation 710 may be performed by a comparison component that is the same as or similar to comparison component 110, in accordance with one or more implementations.

At an operation 712, a temporal alignment estimate between the first energy track and the second energy track based on the comparison of the first energy track and the second energy track may be determined. Operation 712 may be performed by a temporal alignment component that is the same as or similar to temporal alignment 112, in accordance with one or more implementations.

At an operation 714, a synchronization of the first audio file with the second audio file based on the temporal alignment estimate of the first energy track and the second energy track may be performed. Operation 714 may be performed by a synchronizing component that is the same as or similar to synchronizing component 114, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for synchronizing audio tracks, the method comprising:
    (a) obtaining a first feature track for the first audio track including information representing sound captured from a live occurrence, the first feature track representing individual feature samples associated with the sound captured on the first audio track from the live occurrence, the first feature track conveying feature magnitude for individual sampling periods of a first sampling period length;
    (b) obtaining a second feature track for the first audio track, the second feature track representing individual feature samples associated with the sound captured on the first audio track from the live occurrence, the second feature track conveying feature magnitude for individual sampling periods of a second sampling period length, the second sampling period length being different than the first sampling period length;
    (c) obtaining a third feature track for the second audio track including information representing sound captured from the live occurrence, the third feature track representing individual feature samples associated with the sound captured on the second audio track from the live occurrence, the third feature track conveying feature magnitude for individual sampling periods of the first sampling period length;
    (d) obtaining a fourth feature track for the second audio track, the fourth feature track representing individual feature samples associated with the sound captured on the second audio track from the live occurrence, the fourth feature track conveying feature magnitude for individual sampling periods of the second sampling period length;
    (e) comparing at least a portion of the first feature track against at least a portion of the third feature track to correlate one or more features in the first feature track with one or more features in the third feature track, the correlated features being identified as potentially representing features in the same sounds from the live occurrence;
    (f) comparing a portion of the second feature track against a portion of the fourth feature track to correlate one or more features in the second feature track with one or more features in the fourth feature track, the portion of the second feature track and the portion of the fourth feature track being selected for the comparison based on the correlation of features between the first feature track and the third feature track;
    (g) determining, from the correlations of features in the feature tracks, a temporal alignment estimate between the first audio track and the second audio track, the temporal alignment estimate reflecting an offset in time between commencement of sound capture for the first audio track and commencement of sound capture for the second audio track;
    (h) obtaining a temporal alignment threshold;
    (i) determining whether to continue comparing feature tracks associated with the first audio track and the second audio track based on the comparison of the temporal alignment estimate and the temporal alignment threshold, including determining to not continue comparing feature tracks associated with the first audio track and the second track in response to the temporal alignment estimate being smaller than the alignment threshold;
    (j) responsive to the determining to not continue comparing feature tracks associated with the first audio track and the second audio track, using the temporal alignment estimate to synchronize the first audio track with the second audio track;
    (k) responsive to the determining to continue comparing feature tracks associated with the first audio track and the second audio track, iterating after operations (a) through (k).

2. The method of claim 1, wherein the first feature track represents individual energy samples associated with the sound captured on the first audio track from the live occurrence.

3. The method of claim 1, wherein the temporal alignment estimate reflects corresponding feature samples between the first feature track and the third feature track.

4. The method of claim 1, further comprising:
    selecting a comparison window to at least one portion of the first feature track and to at least one portion the third feature track, the comparison window having a start position and an end position, such that the start position corresponding with the individual feature sample having been selected at random, the end position corresponding with the individual feature sample having a predetermined value.

5. The method of claim 4, wherein the comparison window is selected to at least one portion of the second feature track and to at least one portion of the fourth feature track based on the start position and the end position first feature track and the third feature track.

6. The method of claim 1, further comprising:
    determining whether to continue comparing feature tracks associated with the first audio track and the second audio track by assessing whether a stopping criteria has been satisfied, such determination being based on the temporal alignment estimate and the stopping criteria.

7. The method of claim 6, wherein the stopping criteria is satisfied by multiple, consecutive determinations of the temporal alignment estimate falling within a specific range or ranges.

8. The method of claim 7, wherein the specific range or ranges are bounded by a temporal alignment threshold or thresholds.

9. The method of claim 1, wherein the first audio track is generated from a first media file captured from the live occurrence by a first sound capture device, the first media file including audio and video information.

10. The method of claim 1, wherein the second audio track is generated from a second media file captured from the live occurrence by a second sound capture device, the second media file including audio and video information.

11. The method of claim 1, further comprising:
    applying at least one frequency band to the first audio track and applying at least one frequency band to the second audio track.

12. A system for synchronizing audio tracks, the system comprising:
    one or more physical computer processors is further configured by computer readable instructions to:
    (a) obtain a first feature track for the first audio track including information representing sound captured from a live occurrence, the first feature track representing individual feature samples associated with the sound captured on the first audio track from the live occurrence, the first feature track conveying feature magnitude for individual sampling periods of a first sampling period length;

(b) obtain a second feature track for the first audio track, the second feature track representing individual feature samples associated with the sound captured on the first audio track from the live occurrence, the second feature track conveying feature magnitude for individual sampling periods of a second sampling period length, the second sampling period length being different than the first sampling period length;

(c) obtain a third feature track for the second audio track, the third feature track representing individual feature samples associated with the sound captured on the second audio track from the live occurrence, the third feature track conveying feature magnitude for individual sampling periods of the first sampling period length;

(d) obtain a fourth feature track for the second audio track, the fourth feature track representing individual feature samples associated with the sound captured on the second audio track from the live occurrence, the fourth feature track conveying feature magnitude for individual sampling periods of the second sampling period length;

(e) compare at least a portion of the first feature track against at least a portion of the third feature track to correlate one or more features in the first feature track with one or more features in the third feature track, the correlated features being identified as potentially representing features in the same sounds from the live occurrence;

(f) compare a portion of the second feature track against a portion of the fourth feature track to correlate one or more features in the second feature track with one or more features in the fourth feature track, the portion of the second feature track and the portion of the fourth feature track being selected for the comparison based on the correlation of features between the first feature track and the third feature track;

(g) determine, from the correlations of features in the feature tracks, a temporal alignment estimate between the first audio track and the second audio track, the temporal alignment estimate reflecting an offset in time between commencement of sound capture for the first audio track and commencement of sound capture for the second audio track;

(h) obtain a temporal alignment threshold;

(i) determine whether to continue comparing feature tracks associated with the first audio track and the second audio track based on the comparison of the temporal alignment estimate and the temporal alignment threshold, including determining to not continue comparing feature tracks associated with the first audio track and the second track in response to the temporal alignment estimate being smaller than the alignment threshold;

(j) responsive to the determining to not continue comparing feature tracks associated with the first audio track and the second audio track, using the temporal alignment estimate to synchronize the first audio track with the second audio track;

(k) responsive to the determining to continue comparing feature tracks associated with the first audio track and the second audio track, iterating after operations (a) through (k).

13. The system of claim 12, wherein the temporal alignment estimate reflects corresponding feature samples between the first feature track and the third feature track.

14. The system of claim 12, further comprising:
selecting a comparison window to at least one portion of the first feature track and to at least one portion the third feature track, the comparison window having a start position and an end position, such that the start position corresponding with the individual feature sample having been selected at random, the end position corresponding with the individual feature sample having a predetermined value.

15. The system of claim 14, wherein the comparison window is selected to at least one portion of the second feature track and to at least one portion of the fourth feature track based on the start position and the end position first feature track and the third feature track.

16. The system of claim 12, wherein the one or more physical computer processors is further configured by computer readable instructions to:
determine whether to continue comparing feature tracks associated with the first audio track and the second audio track by assessing whether a stopping criteria has been satisfied, such determination being based on the temporal alignment estimate and the stopping criteria.

17. The system of claim 16, wherein the stopping criteria is satisfied by multiple, consecutive determinations of the temporal alignment estimate falling within a specific range or ranges.

18. The system of claim 17, wherein the specific range or ranges are bounded by a temporal alignment threshold or thresholds.

19. The system of claim 12, wherein the first audio track is generated from a first media file captured from the live occurrence by a first sound capture device, the first media file including audio and video information.

20. The system of claim 12, wherein the second audio track is generated from a second media file captured from the live occurrence by a second sound capture device, the second media file including audio and video information.

21. The system of claim 12, wherein the one or more physical computer processors is further configured by computer readable instructions to:
apply at least one frequency band to the first audio track and applying at least one frequency band to the second audio track.

* * * * *